Dec. 8, 1936.                R. L. HIBBARD                2,063,741
                          SELF CENTERING DEVICE
                          Filed July 28, 1936           2 Sheets-Sheet 1

INVENTOR
ROBERT L. HIBBARD
BY James C. Bradley
ATTORNEY.

Dec. 8, 1936.  R. L. HIBBARD  2,063,741
SELF CENTERING DEVICE
Filed July 28, 1936  2 Sheets-Sheet 2
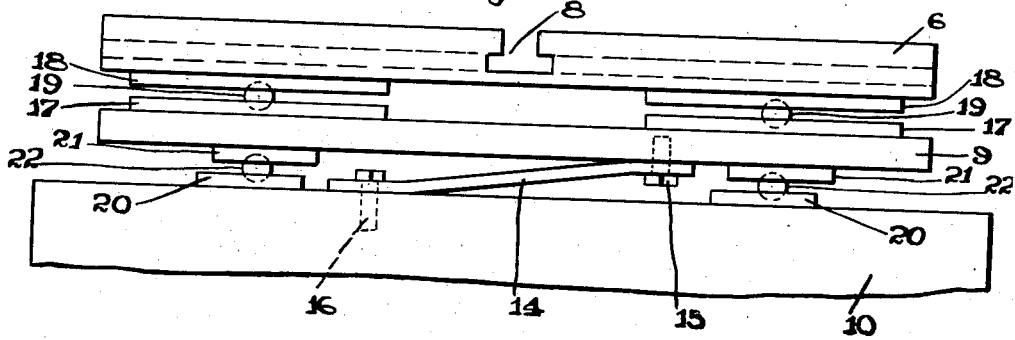
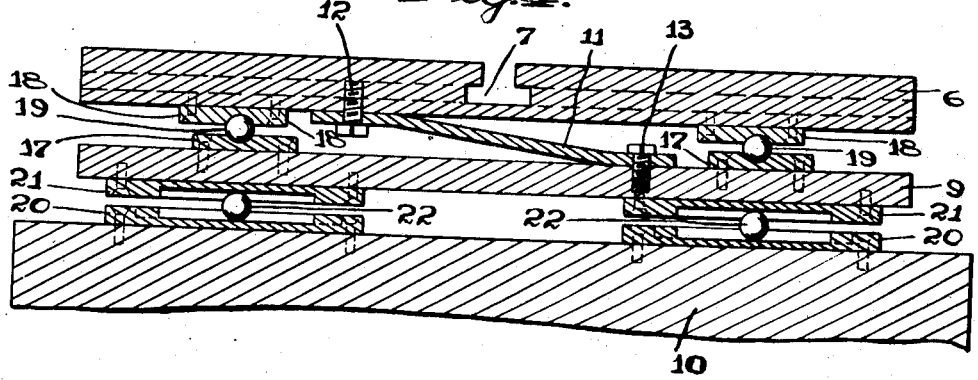
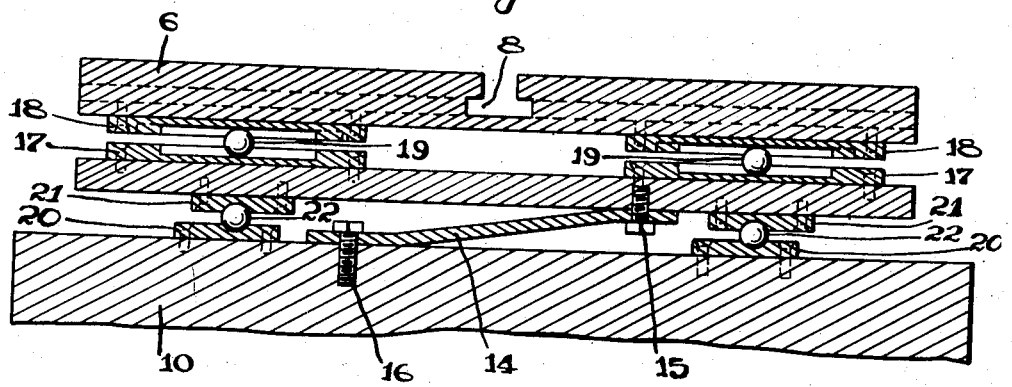
INVENTOR
ROBERT L. HIBBARD
BY James C. Bradley
ATTORNEY Patented Dec. 8, 1936

2,063,741

UNITED STATES PATENT OFFICE 2,063,741

SELF-CENTERING DEVICE

Robert L. Hibbard, Bellevue, Pa., assignor of one-half to William K. Stamets, Pittsburgh, Pa.

Application July 28, 1936, Serial No. 93,012

7 Claims. (Cl. 10—107)

The invention relates to self centering devices for blanks or tools, and involves an improvement over the construction of my Patent No. 1,967,507, dated July 24, 1936. It is primarily designed to carry either the clamping means for holding a blank to be machined or the tool or dies which operate upon the work. The embodiment of the invention shown is a work table to which the work is bolted, or otherwise secured, but it will be understood that the improvement is of broader application and in any relation in which self-centering is required. The objects of the invention are to provide an improved construction having the advantages of my patented construction, but having in addition, improved means for causing the device to center more freely, thus insuring greater accuracy in the cutting operation, reducing the strain on the tools and increasing their life, and making the device easier to adjust in initially bringing the work into registry with the tool, such as a drill reamer or tap.

Figure 1:
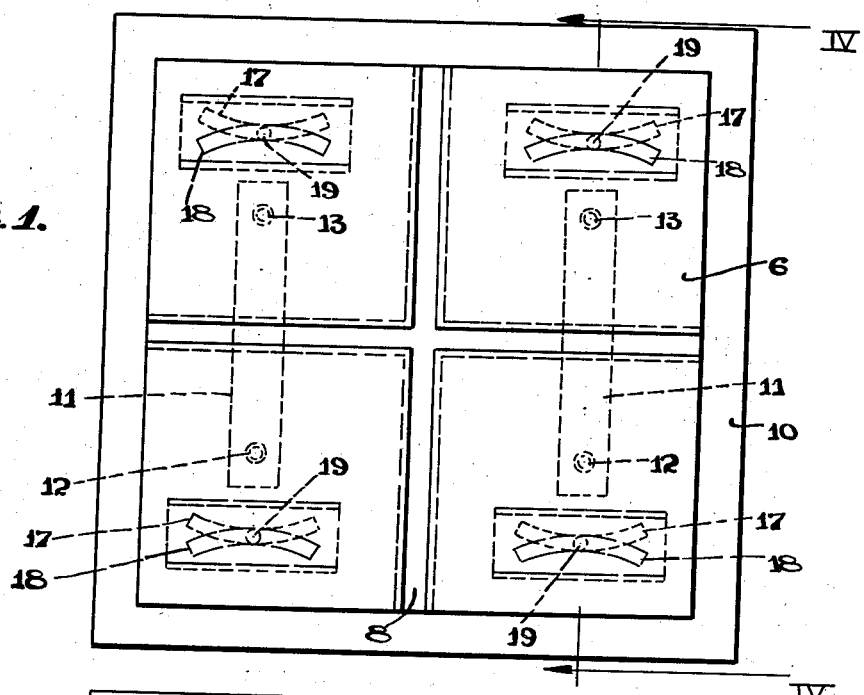
Figure 2:
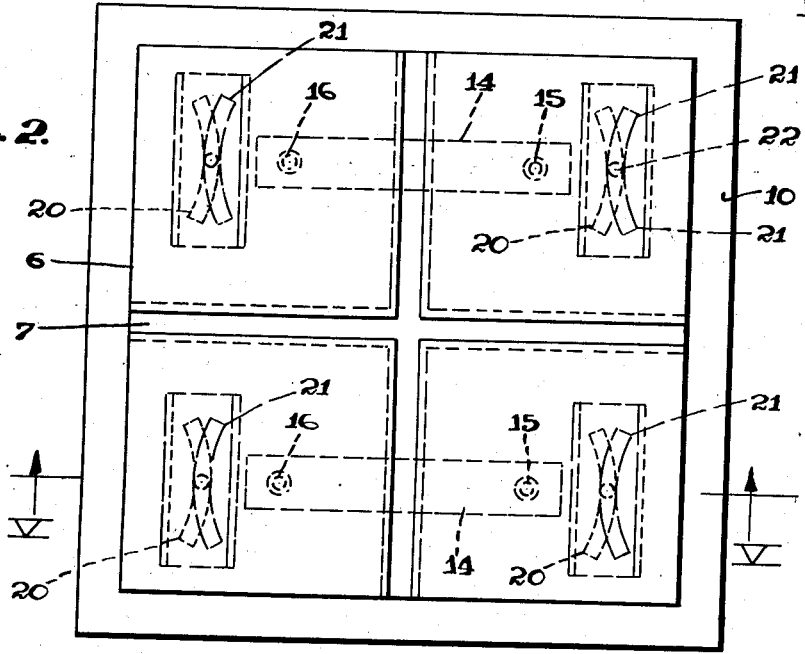

The device is illustrated as applied to a work table which is in horizontal position, rather than to a device which is in a vertical position, as in my patent, since it has greater utility in the first mentioned relation due to the fact that the weight of the parts is added to the thrust of the machine to increase the frictional resistance to centering, but it will be understood that the improvement has a substantial value when incorporated into a structure in which the holder (either for a blank or a tool) is in vertical position. One embodiment of the invention is shown in the accompanying drawings, wherein:

Figure 1 is a plan view with the ball races and parallel link connections between the outer plate or work support and the movable plate or support shown in dotted lines. Fig. 2 is a view similar to that of Fig. 1, but showing in dotted lines, the ball races and parallel link connections between the movable support and fixed support therebeneath. Fig. 3 is a side elevation. And Figs. 4 and 5 are sections on the lines IV—IV of Fig. 1 and V—V of Fig. 2 respectively.

Referring to the drawings, 6 is the outer or work support, which in this case is a plate provided with the T slots 7 and 8; 9 is a movable support or plate lying beneath the plate 6 in parallel therewith; and 10 is a fixed support such as the base plate of a machine. The blanks or other parts, which are to be drilled, reamed or tapped, are secured to the work support 6 by bolts or clamps in any desired manner, the T slots being a common means for carrying the heads of the clamping bolts, and such support will adjust or center itself due to its universal mounting with respect to the fixed plate, as described hereafter.

The outer support or plate 6 is connected to the plate 9 by means of a pair of parallel links 11, 11, such links being pivotally connected to the plate 6 at one end by the bolts 12, 12 and at their other ends to the plate 9 by the bolts 13, 13. This link connection permits the plate 6 to swing laterally on an arc, but maintains the side edges of the plates in parallelism. The plate 9 is connected to the fixed support 10 by a pair of parallel links 14, 14 lying at right angles to the links 11, 11 (see Figs. 1 and 2), such links being pivoted to the plate 9 at one end by the bolts 15, 15 and at their other ends to the support 10 by the bolts 16, 16. This link connection permits the plate 9 to swing laterally on an arc but maintains it against any rotary movement about its center so that its side edges are maintained in parallelism with the side edges of the support 10. The two sets of link connections therefore permit universal movement of the plate 6 in its own plane for centering purposes, but prevent any movement of rotation about its vertical center line.

The plate 9 carries on its upper side opposite the ends of the links 11, 11, the four ball races 17, 17, 17, 17, while the plate 6 carries in opposition to such races, the reversely curved races 18, 18, 18, 18. These pairs of races overlap at their central positions, when the parts are in the normal position indicated in Fig. 1 and carry the balls 19, 19, 19, 19. The curvature of these arcs is dictated by the arc imposed upon the plate by the links 11, so that when the upper plate is moved, the balls ride freely in the races. The only function of the balls and their races is to take the vertical thrust, and reduce to a minimum, the frictional resistance to the relative lateral movement of the plates, the resistance to rotation of the outer plate about its vertical center line being provided for by the links 11, 11, as heretofore pointed out. The radius of curvature of the ball races must be one-half the radius upon which each of the links 11 swings. This relation is due to the fact that the bodily movement of each ball longitudinally of its race is only one-half as great as the movement of the race itself or of any point on the outer plate 6. Since the altitude of the arc of movement of the ball must be one half the altitude of the arc of movement of a point on the plate 6, the radius of the arc of the ball must be correspondingly reduced. Further, it will be seen that a ball placed between a pair of plates and allowed freedom of motion in all directions will, when one plate is moved in an arc with respect to the other, describe an arc on one plate and the same arc reversed on the other plate. In any position of one plate with respect to the other, these arcs coincide at one point only. Due to this fact, the ball is kept in its proper place in both races without requiring a separator or other means to keep the balls from running to one end of the race.

There is a similar anti-friction bearing arrangement between the plate 9 and the support 10, as will be seen by reference to Fig. 2 in connection with Figs. 3 and 4. The support 10 carries on its upper side the ball races 20, 20, 20, 20 while the plate 9 carries on its lower side the reversely curved races 21, 21, 21, 21. These pairs of races are curved and overlap as heretofore described in connection with the races 17 and 18, and each pair carries a ball 22. Here again, the links 14, 14 resist any force applied to the plate 9 tending to rotate it about its vertical center line, while the races and balls take the vertical thrust at right angles to the plane of the plate 9, the balls riding freely in their races and reducing the frictional resistance of the plate 9 against lateral movement with respect to the support 10 to a minimum.

The advantages of the construction incident to its simplicity and free centering, either when applied as shown to a horizontal work table, or in any other relation in which a centering device is applicable, such as in my patent, heretofore referred to, will be readily apparent to those skilled in the art.

What I claim is:

1. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, a plurality of curved ball races between the outer support and the movable support and between the movable support and the fixed support and anti-friction balls in said races.

2. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, a plurality of curved ball races between the outer support and the movable support and between the movable support and the fixed support and anti-friction balls in said races, said races having arcs whose curvature permits the balls to roll freely along paths dictated by the arcs of movement of the outer support and the movable support.

3. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, pairs of opposing ball races between the outer support and movable support and between the movable support and the fixed support, and anti-friction balls in said races, said races having arcs whose curvature permits the balls to roll freely along paths dictated by the arcs of movement of the outer support and the movable support, and the races of each pair being reversely curved.

4. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, a plurality of curved ball races between the outer support and the movable support and between the movable support and the fixed support and anti-friction balls in said races, said races being located opposite the ends of the links and having arcs which permit the balls to roll freely along paths dictated by the arcs of movement of the outer support and the movable support.

5. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, a plurality of curved ball races between the outer support and the movable support and between the movable support and the fixed support, and anti-friction balls in said races, said pairs of races being located opposite the ends of the links and having arcs which permit the balls to roll freely along paths dictated by the arcs of movement of the outer support and the movable support and the races of each pair being reversely curved.

6. In a device of the character described, a pair of opposing parallel members, a parallel link connection between the members so that one member may swing laterally on an arc relative to the other member, but with the side edges of the members maintained in parallelism, pairs of opposing ball races extending transversely of the links, and a ball between each pair of races, the races of each pair being reversely curved with their central portions normally in direct opposition and the arcs thereof adapted to permit the balls to roll freely along paths dictated by the arc of movement of movable member.

7. In combination, an outer support, a movable support back of the outer support parallel therewith, a fixed support back of the movable support parallel therewith, a parallel link connection between the outer support and the movable support, a parallel link connection between the movable support and the fixed support with the links transverse with respect to the links between the outer support and movable support, pairs of opposing ball races between the outer support and movable support and between the movable support and fixed support, and anti-friction balls in said races, said pairs of races being located opposite the ends of the links and having arcs with radii which are one-half that of the parallel links.

ROBERT L. HIBBARD.